United States Patent
Itoh et al.

(10) Patent No.: US 6,773,849 B2
(45) Date of Patent: Aug. 10, 2004

(54) BATTERY SET AND METHOD FOR PRODUCING ELECTRIC POWER OUTPUT

(75) Inventors: Takanori Itoh, Kanagawa-ken (JP); Yuji Tanjo, Kanagawa-ken (JP)

(73) Assignee: Nissan Motor Co., Ltd., Kanagawa-ken (JP)

( * ) Notice: Subject to any disclaimer, the term of this patent is extended or adjusted under 35 U.S.C. 154(b) by 139 days.

(21) Appl. No.: 09/983,389

(22) Filed: Oct. 24, 2001

(65) Prior Publication Data

US 2002/0051904 A1 May 2, 2002

(30) Foreign Application Priority Data

Oct. 31, 2000 (JP) ..................................... P2000-332674

(51) Int. Cl.[7] .......................... H01M 2/24; H01M 2/10; H01M 2/26; H01M 4/50
(52) U.S. Cl. .......................... 429/158; 429/99; 429/160; 429/161; 429/223; 429/224; 429/225
(58) Field of Search .................................. 429/149, 156, 429/158, 160, 161, 224, 96, 99, 223, 225

(56) References Cited

U.S. PATENT DOCUMENTS 6,403,251 B1 * 6/2002 Baggaley et al. .............. 429/61
6,465,986 B1 * 10/2002 Haba ........................... 320/116

FOREIGN PATENT DOCUMENTS

JP 2001-220442 8/2001

OTHER PUBLICATIONS

Hossain, Sohrab, Rechargeable Lithium Batteries (Ambient Temperature), Chapter 36, Handbook of Batteries, second edition, McGraw–Hill, Inc., copyright 1995, pp. 36.2, 36.9–36.11.*

* cited by examiner

*Primary Examiner*—Patrick Ryan
*Assistant Examiner*—Thomas H. Parsons
(74) *Attorney, Agent, or Firm*—McDermott Will & Emery LLP (57) ABSTRACT

A battery set and a method for producing electric power output are disclosed as including a plurality of groups (A, B) of series-connected battery cells, wherein each group produces a voltage of x [V] in a normal state and a voltage of y [V] in an overcharged state and wherein each group includes more than y/(y−x) pieces and less than 400/x pieces of battery cells (12a, 12b, 12c, 12n; 14a, 14b, 14c, 14d, 14n) which are connected in series, and the plurality of groups of the series-connected battery cells are connected in parallel. Preferably, the battery set includes plural groups of more than four pieces of $LiMn_2O_4$ type lithium ion battery cells which are connected in series, with the plural groups being connected in parallel.

4 Claims, 10 Drawing Sheets

|  | NUMBER (N) OF SERIES CONNECTIONS | VOLTAGE (V) |
|---|---|---|
| EXAMPLE 1 | 4 | 4.98 |
| EXAMPLE 2 | 5 | 4.83 |
| EXAMPLE 3 | 6 | 4.71 |
| EXAMPLE 4 | 14 | 4.29 |
| COMPARISON 1 | 3 | 5.20 |

FIG.8

|  | NUMBER (N) OF SERIES CONNECTIONS | VOLTAGE (V) |
|---|---|---|
| EXAMPLE 5 | 7 | 4.44 |
| EXAMPLE 6 | 8 | 4.39 |
| EXAMPLE 7 | 9 | 4.35 |
| EXAMPLE 8 | 14 | 4.28 |
| COMPARISON 2 | 6 | 4.51 |

FIG.9

|  | NUMBER (N) OF SERIES CONNECTIONS | VOLTAGE (V) |
|---|---|---|
| EXAMPLE 9 | 3 | 1.51 |
| EXAMPLE 10 | 4 | 1.39 |
| EXAMPLE 11 | 5 | 1.34 |
| COMPARISON 3 | 2 | 1.68 |

FIG.10

|  | NUMBER (N) OF SERIES CONNECTIONS | VOLTAGE (V) |
|---|---|---|
| EXAMPLE 12 | 4 | 2.33 |
| EXAMPLE 13 | 5 | 2.25 |
| EXAMPLE 14 | 6 | 2.20 |
| COMPARISON 4 | 3 | 2.50 |

FIG.11

|  | NUMBER (N) OF SERIES CONNECTIONS | NUMBER (M) OF PARALLEL CONNECTION | VOLTAGE (V) |
|---|---|---|---|
| EXAMPLE 15 | 4 | 5 | 4.98 |
| EXAMPLE 16 | 5 | 5 | 4.87 |
| EXAMPLE 17 | 6 | 5 | 4.78 |
| EXAMPLE 18 | 14 | 5 | 4.37 |
| EXAMPLE 19 | 4 | 10 | 4.98 |
| EXAMPLE 20 | 5 | 10 | 4.88 |
| EXAMPLE 21 | 6 | 10 | 4.79 |
| EXAMPLE 22 | 14 | 10 | 4.38 |
| COMPARISON 5 | 3 | 5 | 5.31 |
| COMPARISON 6 | 3 | 10 | 5.39 |

FIG.13

BATTERY SET AND METHOD FOR PRODUCING ELECTRIC POWER OUTPUT

BACKGROUND OF THE INVENTION

The present invention relates to battery sets employing a plurality of battery cells in combination, and more particularly to a battery set composed of small sized secondary battery cells and a method for producing electric power output to be suited for use in driving a prime motor of an electric vehicle.

In recent years, a long-standing concern of a background for achieving an environmental protection by reducing carbon dioxide emission is how to promote introduction of clean vehicles such as an electric vehicle (EV) or a hybrid electric vehicle (HEV) in place of automobiles, which use fossil fuels, such as gasoline fueled vehicles in an automobile industry. In order to achieve this end, an extensive research and development work has been undertaken to provide a battery, for driving a prime motor, which has a key factor for a promoted commercialization of such a clean vehicle. In such a battery, it has been a usual practice to employ a secondary battery which is repeatedly rechargeable. In a particular field such as EV or HEV where a large demand exists for an increased power output and an increased energy density for driving the primer motor, it is difficult to manufacture a single unit of a large sized battery and, hence, a plurality of small sized battery cells are generally connected in series to provide a battery set having the large capacity.

With such a structure, however, each unit of the battery cells should have an extremely increased capacity, requiring a specific production line for such battery cell. With the battery set which requires the large capacity for use as the EV's battery, the weight of a single battery inevitably and remarkably increases, with a resultant difficulty caused in the handling work of the battery.

To address this issue, a large number of small sized battery cells, which are easy to handle, are employed and are connected to provide a battery set suited for use in the EV or HEV. In a case where a $LiMn_2O_4$ type lithium ion secondary battery, which has the high power output and high energy density, is used as a battery set for the automobile for charging and discharging characteristics, it has been a usual practice to provide a battery set composed of battery cell groups, each including a plurality of parallel connected unit battery cells, which are connected in series to provide electric power output of 400 V.

SUMMARY OF THE INVENTION

However, with such a state-of-the-art battery set, if either one of the battery cells is internally short circuited, the battery set inevitably becomes inoperative such that the EV/HEV vehicle is rendered inoperative.

For this reason, it is required for the state-of-the-art battery set of the EV/HEV vehicle to have respective battery cells to be installed with respective cell controllers to monitor the operating state of each battery cell, thereby increasing the manufacturing cost. In the event that at least one piece of the battery cells essentially encounters an issue, the battery set is adversely affected with such an issue to be rendered inoperative.

The present invention has been-made in view of the above issue in mind and has an object of the present invention to provide a battery set which is enabled to produce a large amount of electric power output at a large capacity, which is able to reduce the number of components parts without the need for increasingly mounting sensors and controllers to circuits which constitute the battery set and which is not adversely affected by the presence of short circuited condition of a single battery cell.

It is another object of the present invention to provide a method for producing electric power output with a battery set which is not adversely affected with a short circuited battery cell and which is specifically suited for use in an electric vehicle or a hybrid electric vehicle.

Considerable research and development work has been undertaken to address the aforementioned issue by a utilizing a difference between a normally available voltage and voltage under an overcharged condition of to a single battery cell such that plural series-connected battery-cell groups are connected in parallel to be combined and by utilizing more than four pieces of $LiMn_2O_4$ type lithium ion battery cells, with a resultant success performed in the present invention.

According to a first aspect of the present invention, there is provided a battery set which comprises a plurality of groups of series-connected battery cells, wherein each group includes a voltage of x [V] in a normal state and a voltage of y [V] in an overcharged state wherein said each group includes more than $y/(y-x)$ pieces and less than $400/x$ pieces of battery cells which are connected in series, and wherein said plurality of groups of series-connected battery cells are connected in parallel.

An important feature of the present invention concerns the battery cell groups, each of which includes more than four pieces of $LiMn_2O_4$ type lithium ion battery cells connected in series, and which are connected in parallel.

With such an arrangement, the battery set of the present invention includes more number of pieces of unit battery cells which constitute the series-connected battery-cell groups than those used in the state-of-the-art battery set. In effect, in a case where an internal resistance of the battery cell unlimitedly reaches the zero value due to internal short-circuited state of the unit battery cell, electric current tends to flow so as to equalize the voltage between a particular battery-cell group, inclusive of the short-circuited unit battery cell, and the other remaining battery-cell groups, without rendering the other remaining battery-cell groups to be over-charged to allow the battery set to be temporarily available for use in a continuous fashion.

According to a second aspect of the present invention, there is provided a method for producing electric power output, which comprises preparing a plurality of groups of series-connected battery cells wherein each group produces a voltage of x [V] in a normal state and a voltage of y [V] in an overcharged state and wherein each group includes more than $y/(y-x)$ pieces and less than $400/x$ pieces of battery cells which are connected in series, and connecting the plurality of groups of the series-connected battery cells in parallel to form a battery set to obtain electric power output.

BRIEF DESCRIPTION OF THE DRAWINGS

The invention, together with objects and advantages thereof, may best be understood by reference to the following description of the presently preferred embodiments together with the accompanying drawings, in which.

DETAILED DESCRIPTION OF THE PREFERRED EMBODIMENTS

To describe the present invention more in detail, a battery set of a preferred embodiment of the present invention and a method for method for producing electric power output will be explained with reference to the drawings below, with like parts bearing the same reference numerals throughout the drawings.

The battery set of the present invention includes a plurality of groups, each of which includes more than y/(y−x) pieces and less than 400/x pieces of battery cells connected in series, to provide a normally available voltage of x [V] and an over-charged voltage of y [V]. The plurality of groups of series-connected battery cells are connected in parallel.

Here, the "normally available voltage" refers to a voltage that is normally used. Also, the "over-charged voltage" refers to a voltage that becomes higher in a voltage value than the normally available voltage owing to an over-charged state.

When considering the battery set composed of M(2~10) rows, connected in parallel, with each row including N pieces of battery cells connected in series to provide the normally available voltage of x [V] and the over-charged voltage of y [V], in case where a unit battery cell is short-circuited to render the internal electric resistance to have a zero value, the other remaining battery cells of the battery group that includes the short-circuited unit battery cell are not over-charged under a condition expressed by a following inequality:

$$y \times (N-1) \geq x \times N \quad (1)$$

In the above inequality (1), the left side designates the voltage of the battery group that includes the short-circuited unit battery cell, and the right side designates the voltage of the other remaining battery cell groups. In this instance, the voltage of the other remaining battery cell groups should not exceed the total voltage obtained when the other remaining battery cells of the battery cell group that includes the short-circuited unit battery cell remains in the over-charged condition.

Further, when paying an attention to the number N which the battery cells are connected in series, the above inequality (1) is rewritten as follows:

$$N \geq y/(y \times x) \quad (2)$$

In the battery set of the present invention, however, practical tests have revealed that the over-charged state of the battery set is avoided even in a case where the number of pieces of the battery cells is lower than the value calculated under the inequality (2) by 1 or 2. This reason may depend on the fact that the inequality (2) does not consider parameters such as the relationship among the discharging voltage, the charging voltage and the charging rate (%). However, since the relationship among the discharging voltage, the charging voltage and the charging rate (%) are complicated and may vary according to the kinds of the battery set, it is difficult to obtain a precise, general formula with respect to the parameters N, x and y.

In accordance with an essential feature of the present invention, the battery set includes a plurality of groups, each of which is composed of more than y/(y×x) pieces and less than 400/x pieces of battery cells connected in series, and the plurality of groups are connected in parallel. With such a particular arrangement, it is possible for the other remaining battery cells, except for the internally short-circuited battery cell contained in the battery cell group, to avoid the over-charging state. Typically, for example, an upper limit of an output voltage to be used in an electric vehicle is preferably designed to have a value of 400 [V] (provided with 96 pieces of LiMn$_2$O$_4$ type lithium ion secondary battery cells). Further, when taking a safety of a human body into account, the battery set may be designed to preferably have a value of 60 [V] (provided with 14 pieces of LiMn$_2$O$_4$ type lithium ion secondary battery cells). Also, the larger the number of pieces of the battery cells, the larger will be the internal electrical resistance, and, hence, the smaller the number of pieces of the battery cells, the better will be the reliability of the battery set. Further, in a case where the battery set is composed of less than the number of pieces of the battery cells expressed by y/(y−x), the short-circuited state of the battery cell renders the other remaining battery cells to be inoperative. Thus, in a case where the battery set is composed of more than the number of pieces of the battery cells expressed by 400/x, such a battery set is not suited for use in the electric vehicle.

Also, the above battery set may be constructed of a LiMn$_2$O$_4$ type or LiNiO$_2$ type lithium ion secondary batteries, Ni—H batteries or lead storage batteries.

Now, a battery set of an alternative preferred embodiment is described below in detail.

Such a battery set includes battery cell groups of more than four pieces, of the lithium ion secondary battery cell of LiMn$_2$O$_4$ type, which are connected in series, with a plurality of series connected battery cell groups being connected in parallel.

With such a structure of the battery set, even when the unit battery cell is short-circuited, it is possible for the other remaining battery cells to remain in an operative condition. In a case where the battery set is composed of less than 4 pieces of the battery cells, further, the other remaining battery cells of the group, that includes the short-circuited battery cell, become over-charged.

Here, although the positive electrode of the aforementioned battery cell is basically composed of a material of $LiMn_2O_4$, the battery cell may include a lithium ion battery of the type lacked of Li or of the type in excess of Li. Also, a part of Mn may be substituted with metal elements such as an arbitrary combination between transition metal elements except Mn and/or other metal elements. Further, the aforementioned lithium battery cell may be of the type lacked in oxygen (O) or the type in excess of oxygen (O). Furthermore, a part of oxygen (O) may be substituted with elements such as sulfur (S), fluorine (F) or chloride (Cl), and an arbitrary combination of these compounds.

Also, the negative electrode of the aforementioned battery cell may be made of any material which is used in a secondary battery cell of a usual non-water electrolyte type. For example, such a material involves lithium type metal elements such as lithium metal or lithium alloy, metal oxides such as $SnSiO_3$, metallic nitrides such as $LiCoN_2$ and a carbon. Also, the negative electrode of the battery cell may be suitably made of carbon materials such as cokes, natural graphite, artificial graphite and non-graphitized carbon.

In addition, the battery cell includes electrolyte such as various lithium chlorides which are dissolved in non-water solvent such as organic solvent. In particular, the lithium chloride may involve $LiClO_4$, $LiAsF_6$, $LiPF_6$, $LiBF_6$, $LiCF_3SO_3$ and $Li (CF_3SO_2)_2 N$ which are used in the state-of-the-art battery cells. Also, the organic solvent may not be limited to a particular element but may involve a solvent or solvents mixed with more than two compounds of a carbonate group, a lactone group and an ether group, such as ethylene carbonate, propylene carbonate, diethyl carbonate, dimethyl carbonate, methyl ethylcarbonate, 1,2dimetoxyethane, 1,2diethoxyethane, tetrahydrofuran, 1,3dixolane and γ-butyrolactone. Also, the concentration of the electrolyte to be dissolved in such a non-water solvent or such an organic solvent is preferably selected to have a value ranging from 0.5 to 2.0 mol/litter.

Furthermore, it is possible to employ electrolyte medium other than those listed above, such as for example a solid body or a viscid body composed of the aforementioned electrolyte uniformly dispersed in a macromolecule matrix, or the high polymer matrix structure dispersed with non-water solvent. In this case, the macromolecule matrix may be made of, for example, polyethylene oxide, polypropylene oxide, polyacrylonitrile and polyvinylidene fluorolide, etc.

Further, the aforementioned lithium battery cell may include a separator to prevent the short-circuiting between the positive and negative electrodes. Such a separator may be composed of a porous sheet or a nonwoven fabric of a macromolecule material such as polyethylene and cellulose.

As previously noted above, the battery set of the present invention includes the groups of battery cells which are connected in series, with the series connected battery cell groups being connected in parallel in plural states. With such a particular structure, the battery set is enabled to be repeatedly charged for use, while achieving an increased power output and an increased energy density.

In the aforementioned battery set of the present invention, it is preferable to take a sub-module structure such that the aforementioned battery cell groups are detachably assembled for each series-connected battery-cell group. While, in the state-of-the-art battery set, unit battery cells have respective cell controllers (voltmeters), the particular structure of the battery set of the present invention allows on each battery cell group to be provided with one piece of the cell controllers, with a resultant decrease in the manufacturing cost. Another important advantage of the battery set of the present invention concerns the sub-module structure which provides an ease of replacement of or repair of component parts by detachably manipulating each series-connected battery cell group in case of a failure or a damage caused in the battery set.

Further, another important advantage of the battery set of the present invention concerns a capability to be suitably used in an electric vehicle or a hybrid type electric vehicle. This is because of he fact that the battery set of the present invention is enabled to be repeatedly charged for repeated use to provide a high power output and a high energy density.

Preferred Embodiment

The battery set of the present invention is described below in detail with reference to EXAMPLES and COMPARISONS, though the present invention is not limited to these

EXAMPLES

Voltage Measurement for Battery Cell During Over-Charging State

Figure 1:
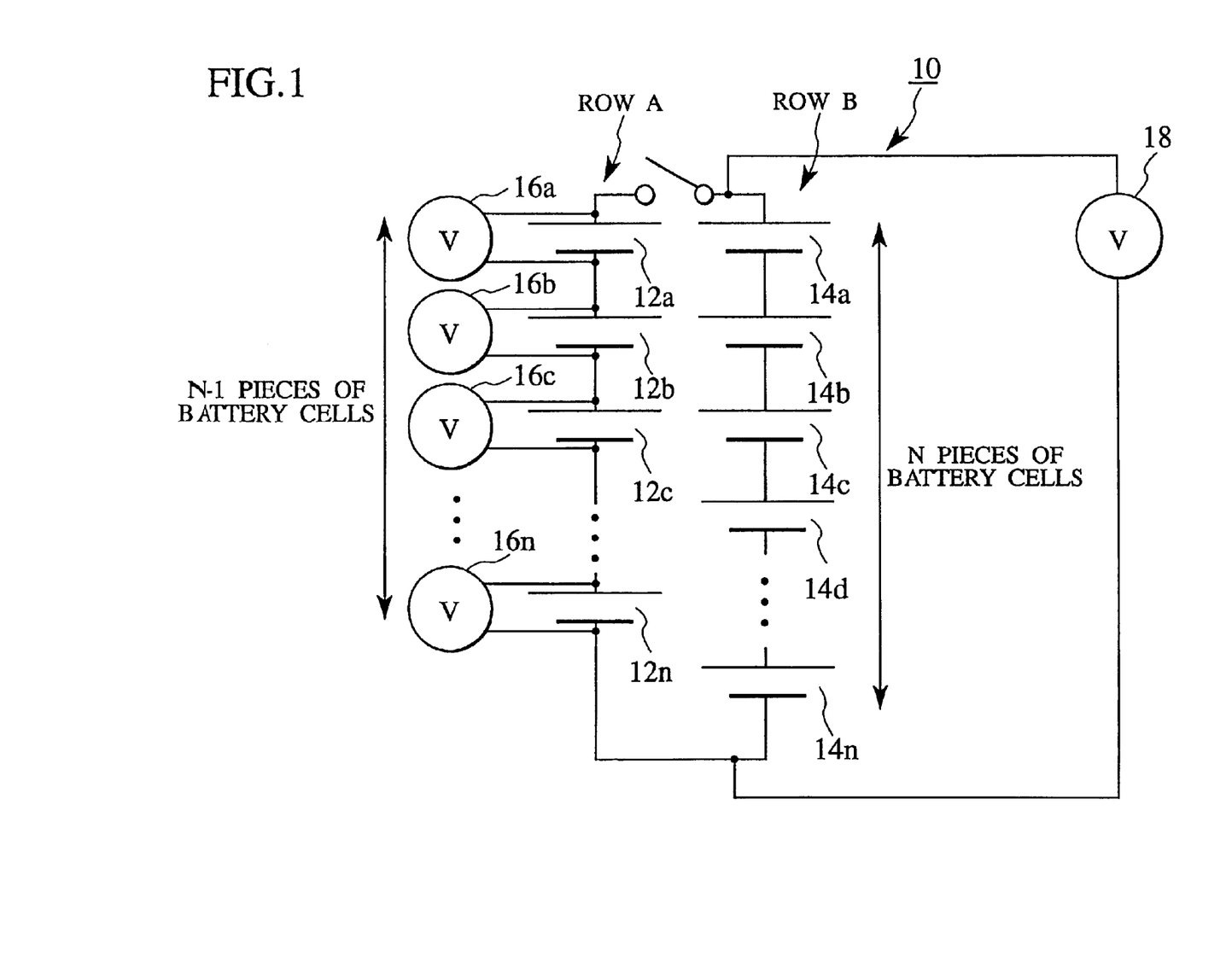
FIG. 1 is a schematic view of a battery set of a preferred embodiment according to the present invention.

As shown in FIG. 1, the battery set 10 of the present invention includes a first row (group) A that includes (N–1) pieces of battery cells 12a, 12b, 12c and 12n which are connected in series, and a second row (group) B that includes N pieces of battery cells 14a, 14b, 14c, 14d and 14n which are connected in series, with the first and second rows A and B being connected in parallel.

In the first row A of the battery set 10, since one unit battery cell is short-circuited and the electric resistance is assumed to be zero, the first row A includes (N–1) pieces of the battery cells while the second row B includes N pieces of the battery cells. The battery cells 12a, 12b, 12c and 12n are connected in parallel to respective voltmeters 16a, 16b, 16c and 16n to have monitored respective output voltages such that these output voltages are balanced at 10 Hz. A voltmeter 18 is coupled to the battery set 10 to monitor the output voltage thereof. As exemplified in the EXAMPLES and COMPARISONS described below, the voltage measurement has been conducted using the lithium battery (positive electrode: $LiMn_2O_4$ or $LiNiO_2$; negative electrode: carbon), a Ni—H battery and a lead battery.

$LiMn_2O_4$ Type Lithium Ion Secondary Battery

Example 1

Figure 2:
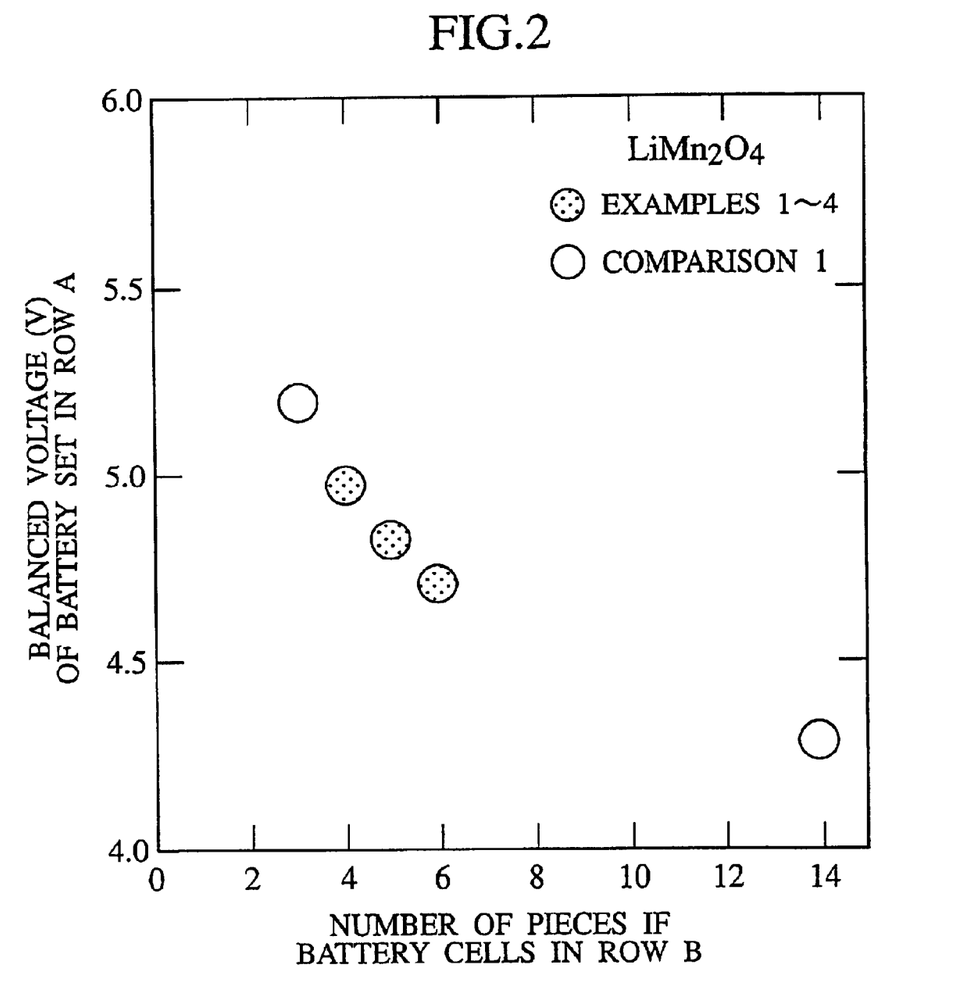
FIG. 2 is a graph illustrating the relationship between the balanced voltage of a first row A of battery cells and the number of pieces of battery cells in a second row B in case of a LiMn$_2$O$_4$ type lithium ion secondary battery.
Figure 7:
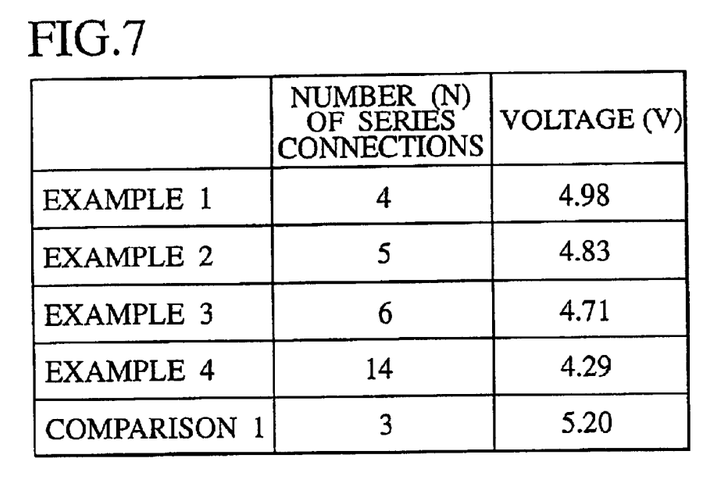
FIGS. 7 to 11 are views for illustrating tables showing measured results in terms of EXAMPLES and COMPARISONS.

The lithium ion secondary battery with the positive electrode of $LiMn_2O_4$ and the negative electrode of carbon was used for measuring the output voltage. In a case where N=4 with two rows connected in parallel, an average balanced voltage measured at the unit battery cell of the first row A was 4.98±0.01 V. The measured result is shown in FIGS. 2 and 7.

Example 2

The lithium ion secondary battery with the positive electrode of $LiMn_2O_4$ and the negative electrode of carbon was used for measuring the output voltage. In a case where N=5 with two rows connected in parallel, an average balanced voltage measured at the battery cell of the first row A was 4.83±0.01 V. The measured result is shown in FIGS. 2 and 7.

Example 3

The lithium ion secondary battery with the positive electrode of $LiMn_2O_4$ and the negative electrode of carbon was used for measuring the output voltage. In a case where N=6 with two rows connected in parallel, an average balanced voltage measured at the battery cell of the first row A was 4.71±0.01 V. The measured result is shown in FIGS. 2 and 7.

Example 4

The lithium ion secondary battery with the positive electrode of $LiMn_2O_4$ and the negative electrode of carbon was used for measuring the output voltage. In a case where N=14 with two rows connected in parallel, an average balanced voltage measured at the battery cell of the first row A was 4.29±0.01 V. The measured result is shown in FIGS. 2 and 7.

Comparison 1

The lithium ion secondary battery with the positive electrode of $LiMn_2O_4$ and the negative electrode of carbon was used for measuring the output voltage. In a case where N=3 with two rows connected in parallel, an average balanced voltage measured at the battery cell of the first row A was 5.20±0.01 V. The measured result is shown in FIGS. 2 and 7.

As shown in FIGS. 2 and 7, in the battery set of the present invention wherein the lithium ion battery, which has the positive electrode of $LiMn_2O_4$ and the negative electrode of carbon, includes battery cell groups, which are connected in parallel, with each group composed of more than four series-connected battery cells, it appears that, even when one unit battery cell is short circuited to render its electrical resistance to become zero, the other remaining battery cells are not over charged.

$LiNiO_2$ Type Lithium Ion Secondary Battery

Example 5

Figure 3:
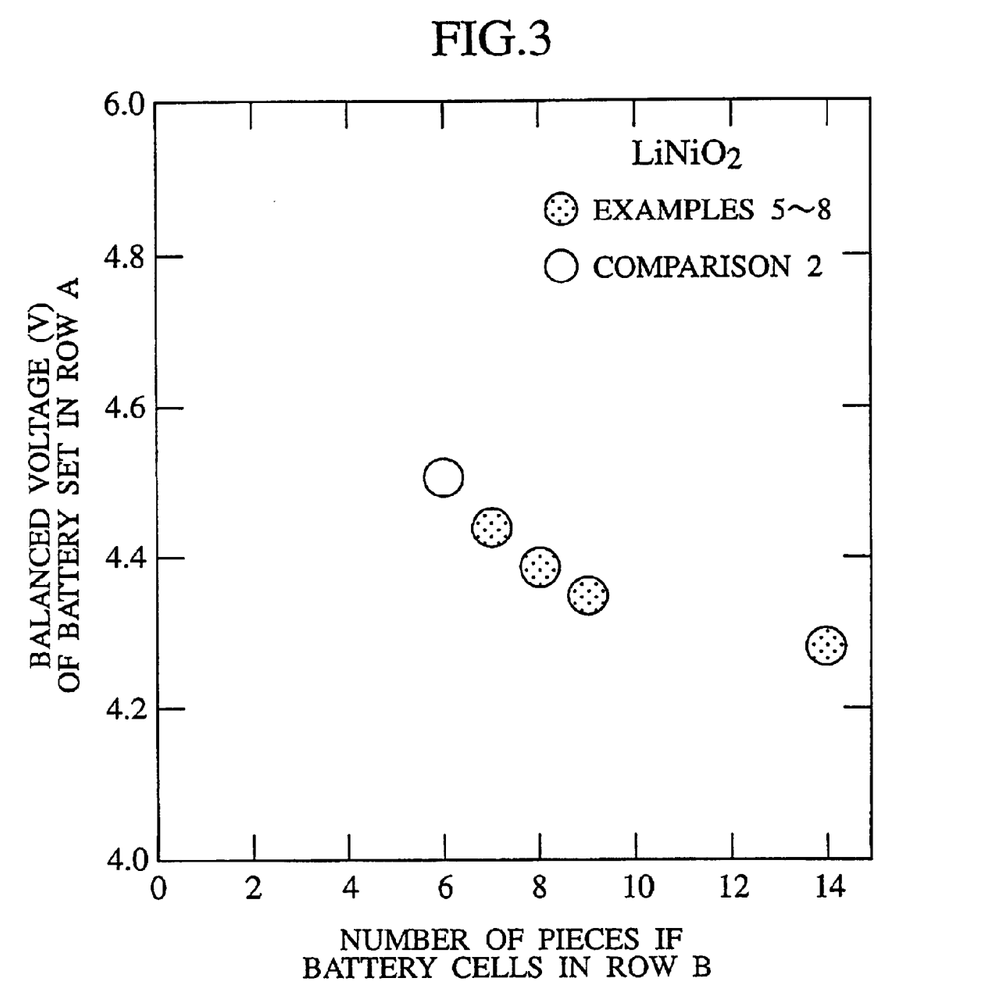
FIG. 3 is a graph illustrating the relationship between the balanced voltage of a first row A of battery cells and the number of pieces of battery cells in a second row B in case of a LiMn$_2$O$_4$ type lithium ion secondary battery.
Figure 8:
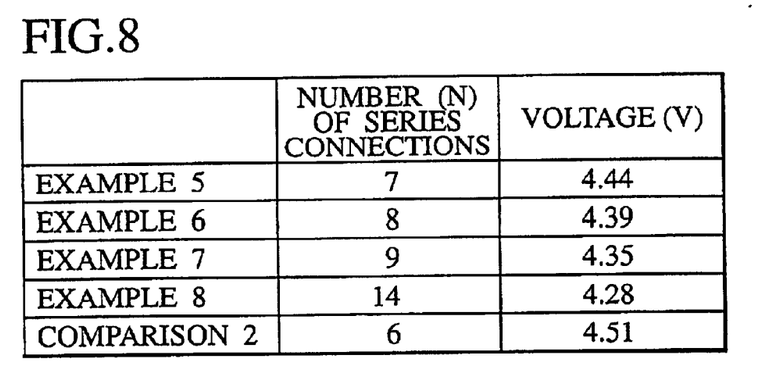

The lithium ion secondary battery with the positive electrode of $LiNiO_2$ and the negative electrode of carbon was used for measuring the output voltage. In a case where N=7 with two rows connected in parallel, an average balanced voltage measured at the battery cell of the first row A was 4.44±0.01 V. The measured result is shown in FIGS. 3 and 8.

Example 6

The lithium ion secondary battery with the positive electrode of $LiNiO_2$ and the negative electrode of carbon was used for measuring the output voltage. In a case where N=8 with two rows connected in parallel, an average balanced voltage measured at the battery cell of the first row A was 4.39±0.01 V. The measured result is shown in FIGS. 3 and 8.

Example 7

The lithium ion secondary battery with the positive electrode of $LiNiO_2$ and the negative electrode of carbon was used for measuring the output voltage. In a case where N=9 with two rows connected in parallel, an average balanced voltage measured at the battery cell of the first row A was 4.35±0.01 V. The measured result is shown in FIGS. 3 and 8.

Example 8

The lithium ion secondary battery with the positive electrode of $LiNiO_2$ and the negative electrode of carbon was used for measuring the output voltage. In a case where N=14 with two rows connected in parallel, an average balanced voltage measured at the battery cell of the first row A was 4.28±0.01 V. The measured result is shown in FIGS. 3 and 8.

Comparison 2

The lithium ion secondary battery with the positive electrode of $LiNiO_2$ and the negative electrode of carbon was used for measuring the output voltage. In a case where N=6 with two rows connected in parallel, an average balanced voltage measured at the battery cell of the first row A was 4.51±0.01 V. The measured result is shown in FIGS. 3 and 8

As shown in FIGS. 3 and 8, in the battery set of the present invention wherein the lithium ion battery, which has the positive electrode of $LiNiO_2$ and the negative electrode of carbon, includes battery cell groups, which are connected in parallel, with each group composed of more than seven series-connected battery cells, it appears that, even when one unit battery cell is short-circuited to render its electrical resistance to become zero, the other remaining battery cells are not over charged.

Ni—H Type Secondary Battery

Example 9

Figure 4:
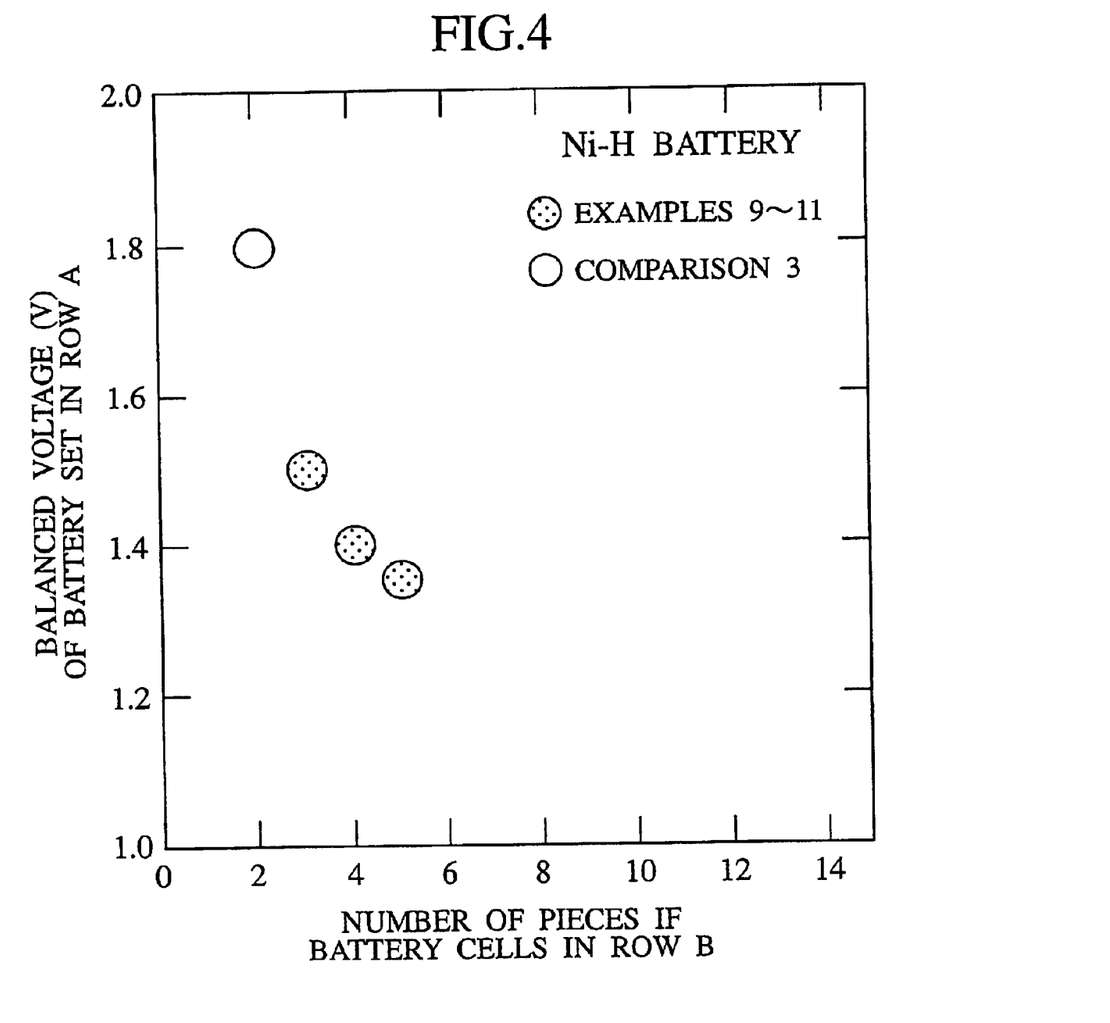
FIG. 4 is a graph illustrating the relationship between the balanced voltage of a first row A of battery cells and the number of pieces of battery cells in a second row B in case of a Ni—H type battery.
Figure 9:
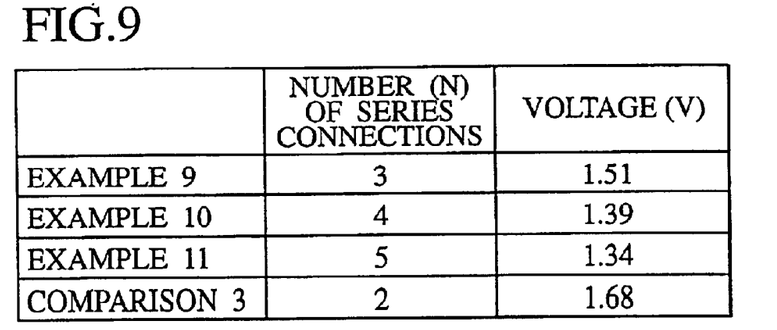

The Ni—H type secondary battery wherein N=3 with two rows connected in parallel, an average balanced voltage measured at the battery cell of the first row A was 1.51±0.01 V. The measured result is shown in FIGS. 4 and 9.

Example 10

The Ni—H type secondary battery where N=4 with two rows connected in parallel, an average balanced voltage measured at the battery cell of the first row A was 1.39±0.01 V. The measured result is shown in FIGS. 4 and 9.

Example 11

The Ni—H type secondary battery where N=5 with two rows connected in parallel, an average balanced voltage measured at the battery cell of the first row A was 1.34±0.01 V. The measured result is shown in FIGS. 4 and 9.

Comparison 3

The Ni—H type secondary battery was used for measuring the output voltage. In a case where N=2 with two rows connected in parallel, an average balanced voltage measured at the battery cell of the first row A was 1.68±0.01 V. The measured result is shown in FIGS. 4 and 9.

As shown in FIGS. 4 and 9, in the battery set of the present invention wherein the Ni—H type secondary battery includes battery cell groups, which are connected in parallel, with each group composed of more than three series-connected battery cells, it appears that, even when one unit battery cell is short-circuited to render its electrical resistance to become zero, the other remaining battery cells are not over charged.

Lead Battery

Example 12

Figure 5:
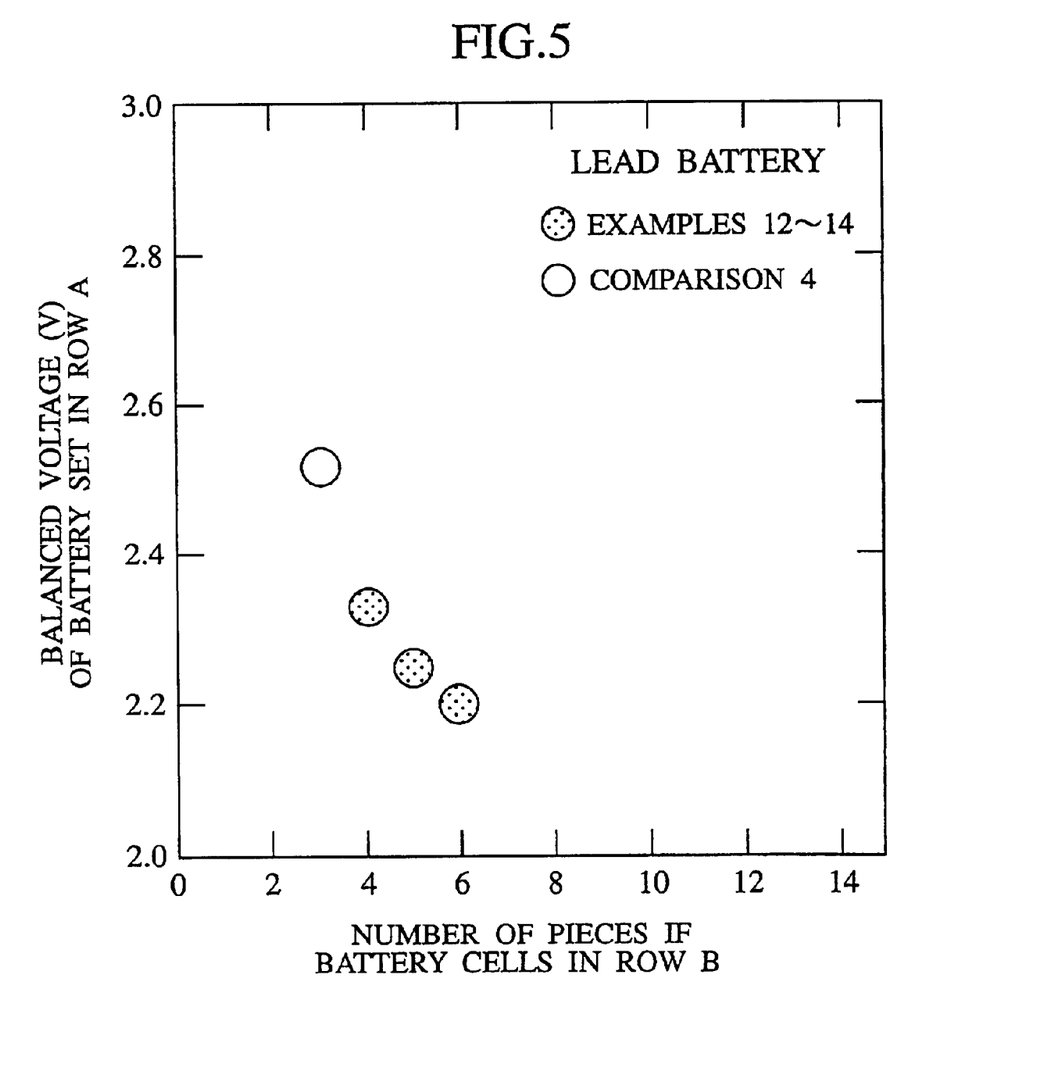
FIG. 5 is a graph illustrating the relationship between the balanced voltage of a first row A of battery cells and the number of pieces of battery cells in a second row B in case of a lead battery.
Figure 10:
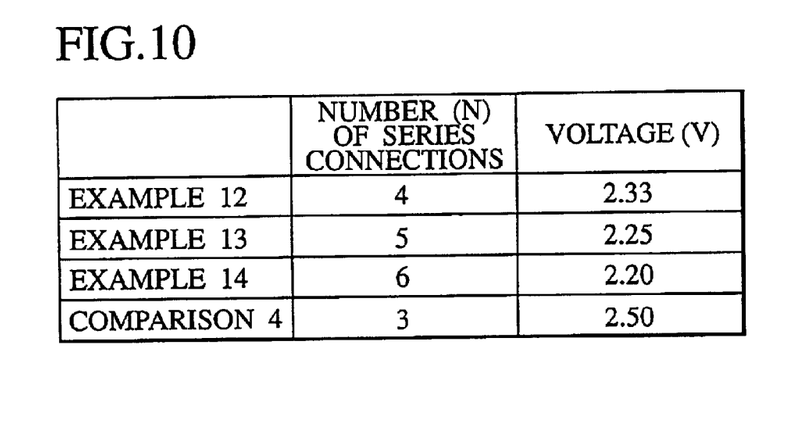

The lead battery was used for measuring the output voltage. In a case where N=4 with two rows connected in parallel, an average balanced voltage measured at the battery cell of the first row A was 2.33±0.01 V. The measured result is shown in FIGS. 5 and 10.

Example 13

The lead battery was used for measuring the output voltage. In a case where N=5 with two rows connected in parallel, an average balanced voltage measured at the battery cell of the first row A was 2.25±0.01 V. The measured result is shown in FIGS. 5 and 10.

Example 14

The lead battery was used for measuring the output voltage. In a case where N=6 with two rows connected in parallel, an average balanced voltage measured at the battery cell of the first row A was 2.20±0.01 V. The measured result is shown in FIGS. 5 and 10.

Comparison 4

The lead battery was used for measuring the output voltage. In a case where N=3 with two rows connected in parallel, an average balanced voltage measured at the battery cell of the first row A was 2.50±0.01 V. The measured result is shown in FIGS. 5 and 10.

As shown in FIGS. 5 and 10, in the battery set of the present invention wherein the lead battery includes battery cell groups, which are connected in parallel, with each group composed of more than four series-connected battery cells, it appears that, even when one piece of the battery cell is short circuited to render its electrical resistance to become zero, the other remaining battery cells are not over charged.

$LiMn_2O_4$ Type Lithium Ion Secondary Battery
(Five Rows and Ten Rows Connected in Parallel)

Example 15

Figure 6:
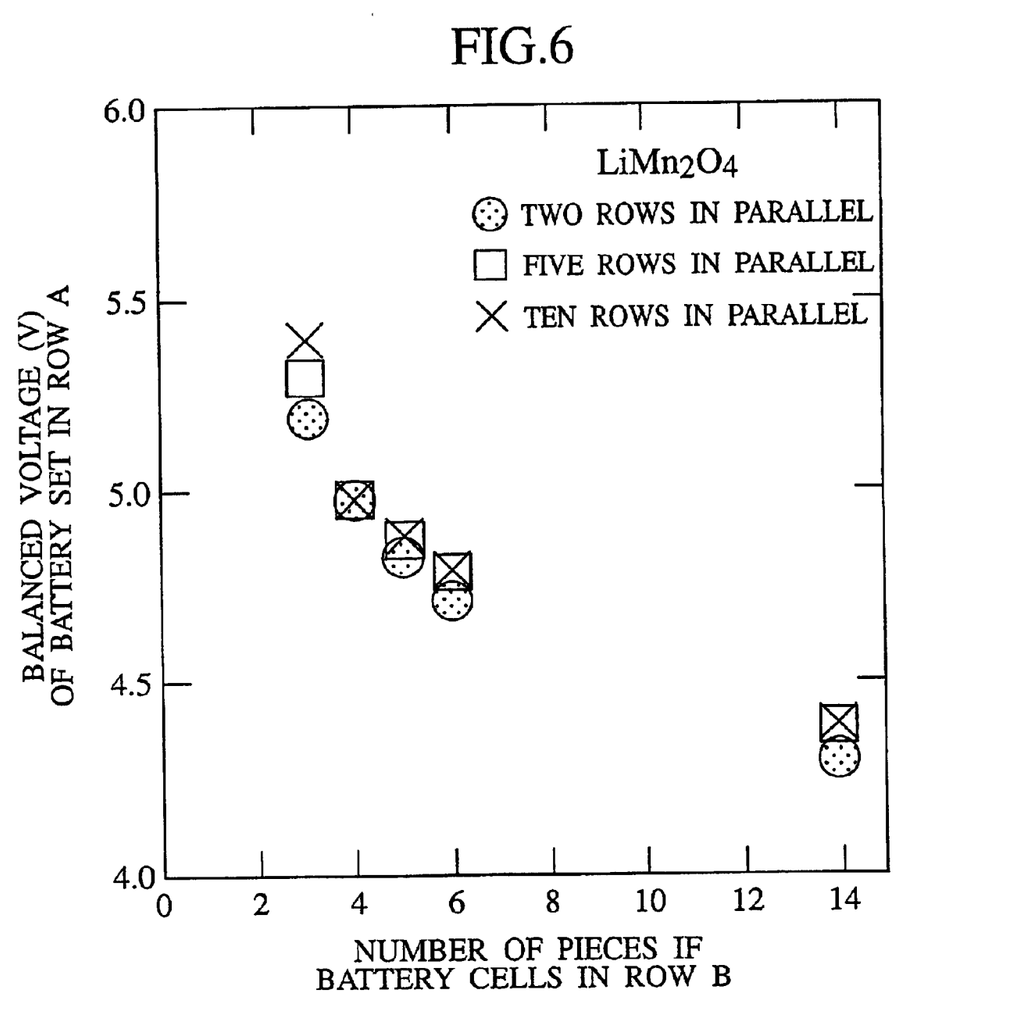
FIG. 6 is a graph illustrating the relationship among the balanced voltage of a first row A of battery cells, the number of pieces of battery cells in a second row Band, and the number (2~10) of parallel connections in case of a LiMn$_2$O$_4$ type lithium ion secondary battery.
Figure 11:
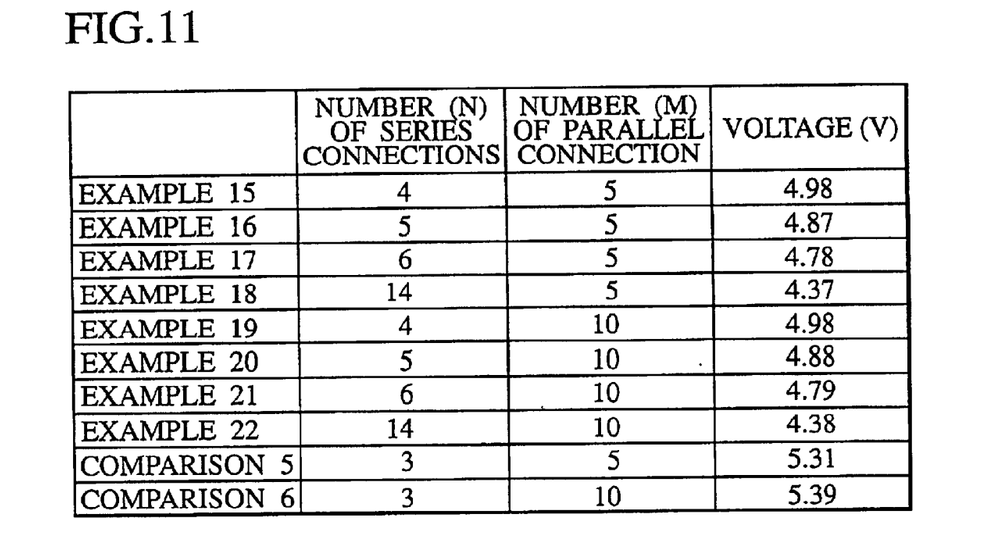

The lithium ion secondary battery with the positive electrode of $LiMn_2O_4$ and the negative electrode of carbon was used for measuring the output voltage. In a case where N=4 with five rows connected in parallel, an average balanced voltage measured at the battery cell of the first row A was 4.98±0.01 V. The measured result is shown in FIGS. 6 and 11.

Example 16

The lithium ion secondary battery with the positive electrode of $LiMn_2O_4$ and the negative electrode of carbon was used for measuring the output voltage. In a case where N=5 with five rows connected in parallel, an average balanced voltage measured at the battery cell of the first row A was 4.87±0.01 V. The measured result is shown in FIGS. 6 and 11.

Example 17

The lithium ion secondary battery with the positive electrode of $LiMn_2O_4$ and the negative electrode of carbon was used for measuring the output voltage. In a case where N=6 with five rows connected in parallel, an average balanced voltage measured at the battery cell of the first row A was 4.78±0.01 V. The measured result is shown in FIGS. 6 and 11.

Example 18

The lithium ion secondary battery with the positive electrode of $LiMn_2O_4$ and the negative electrode of carbon was used for measuring the output voltage. In a case where N=14 with five rows connected in parallel, an average balanced voltage measured at the battery cell of the first row A was 4.37±0.01 V. The measured result is shown in FIGS. 6 and 11.

Example 19

The lithium ion secondary battery with the positive electrode of $LiMn_2O_4$ and the negative electrode of carbon was used for measuring the output voltage. In a case where N=4 with ten rows connected in parallel, an average balanced voltage measured at the battery cell of the first row A was 4.98±0.01 V. The measured result is shown in FIGS. 6 and 11.

Example 20

The lithium ion secondary battery with the positive electrode of $LiMn_2O_4$ and the negative electrode of carbon was used for measuring the output voltage. In a case where N=5 with ten rows connected in parallel, an average balanced voltage measured at the battery cell of the first row A was 4.88±0.01 V. The measured result is shown in FIGS. 6 and 11.

Example 21

The lithium ion secondary battery with the positive electrode of $LiMn_2O_4$ and the negative electrode of carbon was used for measuring the output voltage. In a case where N=6 with ten rows connected in parallel, an average balanced voltage measured at the battery cell of the first row A was 4.79±0.01 V. The measured result is shown in FIGS. 6 and 11.

Example 22

The lithium ion secondary battery with the positive electrode of $LiMn_2O_4$ and the negative electrode of carbon was used for measuring the output voltage. In a case where N=14 with ten rows connected in parallel, an average balanced voltage measured at the battery cell of the first row A was 4.38±0.01 V. The measured result is shown in FIGS. 6 and 11.

Comparison 5

The lithium ion secondary battery with the positive electrode of $LiMn_2O_4$ and the negative electrode of carbon was used for measuring the output voltage. In a case where N=3 with five rows connected in parallel, an average balanced voltage measured at the battery cell of the first row A was 5.31±0.01 V. The measured result is shown in FIGS. 6 and 11.

Comparison 6

The lithium ion secondary battery with the positive electrode of $LiMn_2O_4$ and the negative electrode of carbon was used for measuring the output voltage. In a case where N=3 with five rows connected in parallel, an average balanced voltage measured at the battery cell of the first row A was 5.39±0.01 V. The measured result is shown in FIGS. 6 and 11.

As shown in FIGS. 6 and 11, in the battery set of the present invention wherein the lithium ion battery, which has the positive electrode of $LiMn_2O_4$ and the negative electrode of carbon, includes two to ten battery cell groups, which are connected in parallel, with each group being composed of more than four series-connected battery cells, it appears that, even when one piece of the battery cell is short circuited to render its electrical resistance to become zero, the other remaining battery cells are not over charged.

It will now be appreciated from the foregoing description that, while the present invention has been shown and described in detail with reference to the preferred embodiment, the present invention is not intended to be limited thereto and various other modification or changes may be made without departing from the scope of the present invention.

For example, in a typical practice, the battery set may preferably include four to eight pieces of the battery cells, with two to ten groups of series connected battery cells. Further, the battery set may have any desired outer shape, such as a flat plate type, a cylindrical type, a rectangular type and a laminated structure type. Furthermore, the battery set of the present invention may be used as a composite structure in combination with a primary battery, a fuel cell battery and a solar cell battery.

As previously noted above, an important feature of the present invention concerns the use of more than four pieces $LiMn_2O_4$ type lithium ion battery cells composed of plural groups of series connected battery cells by utilizing a voltage difference between a usually available voltage of the single battery cell and a voltage in the over-charged state of the battery cells. This results in a capability of practicing a battery set having a large power output and a large capacity without the need for component parts such as sensors and controllers to be used in a circuit which constitutes a part of the battery set. Another important advantage resides in the fact that, even in the presence of the short-circuited condition in the battery cell, the other remaining battery cells are not adversely affected to maintain a reliably operative state of the battery set.

Figure 12:
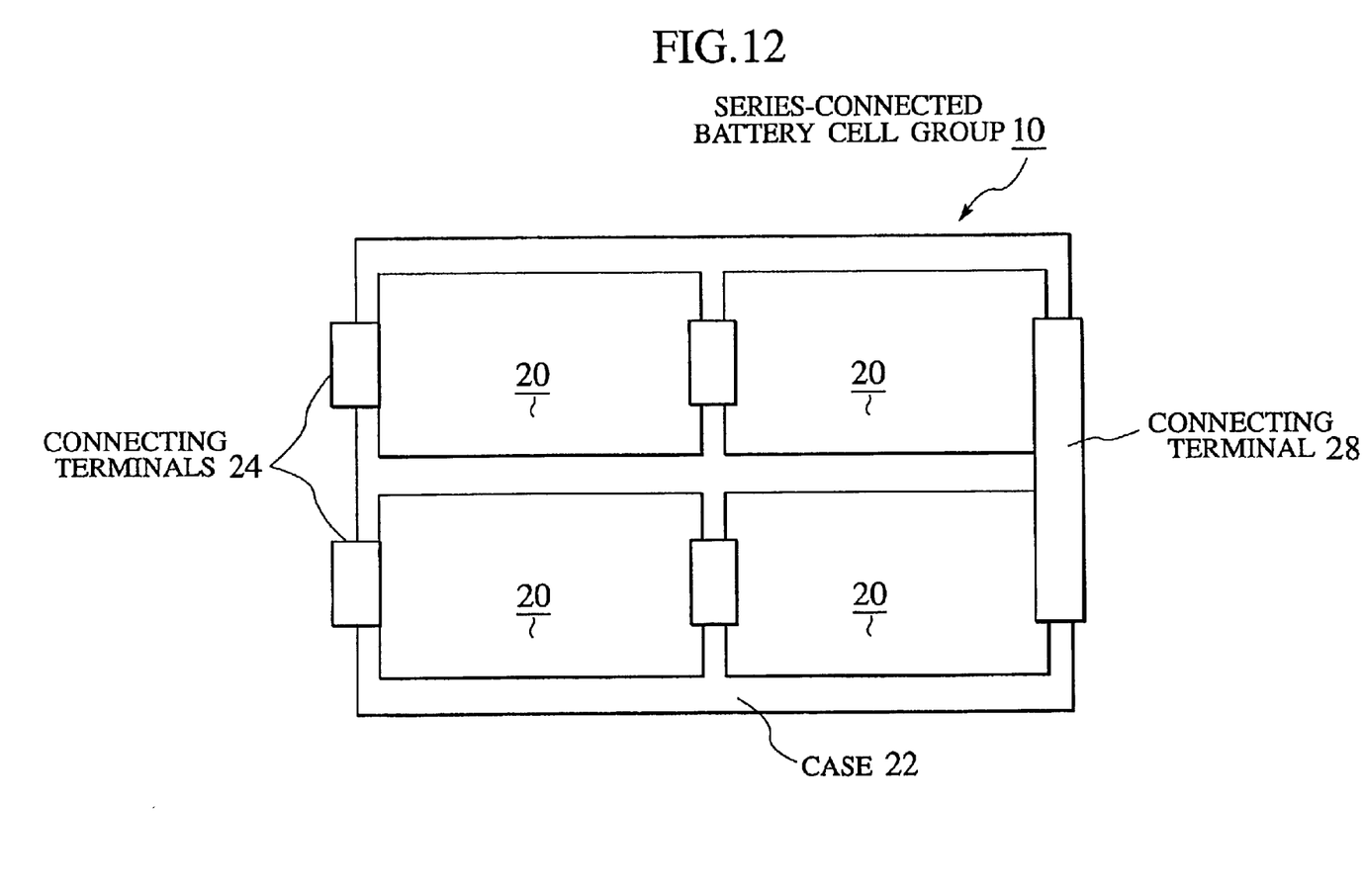
FIG. 12 is a schematic view for illustrating a sub-module structure forming the battery set according to the present invention.
Figure 13:
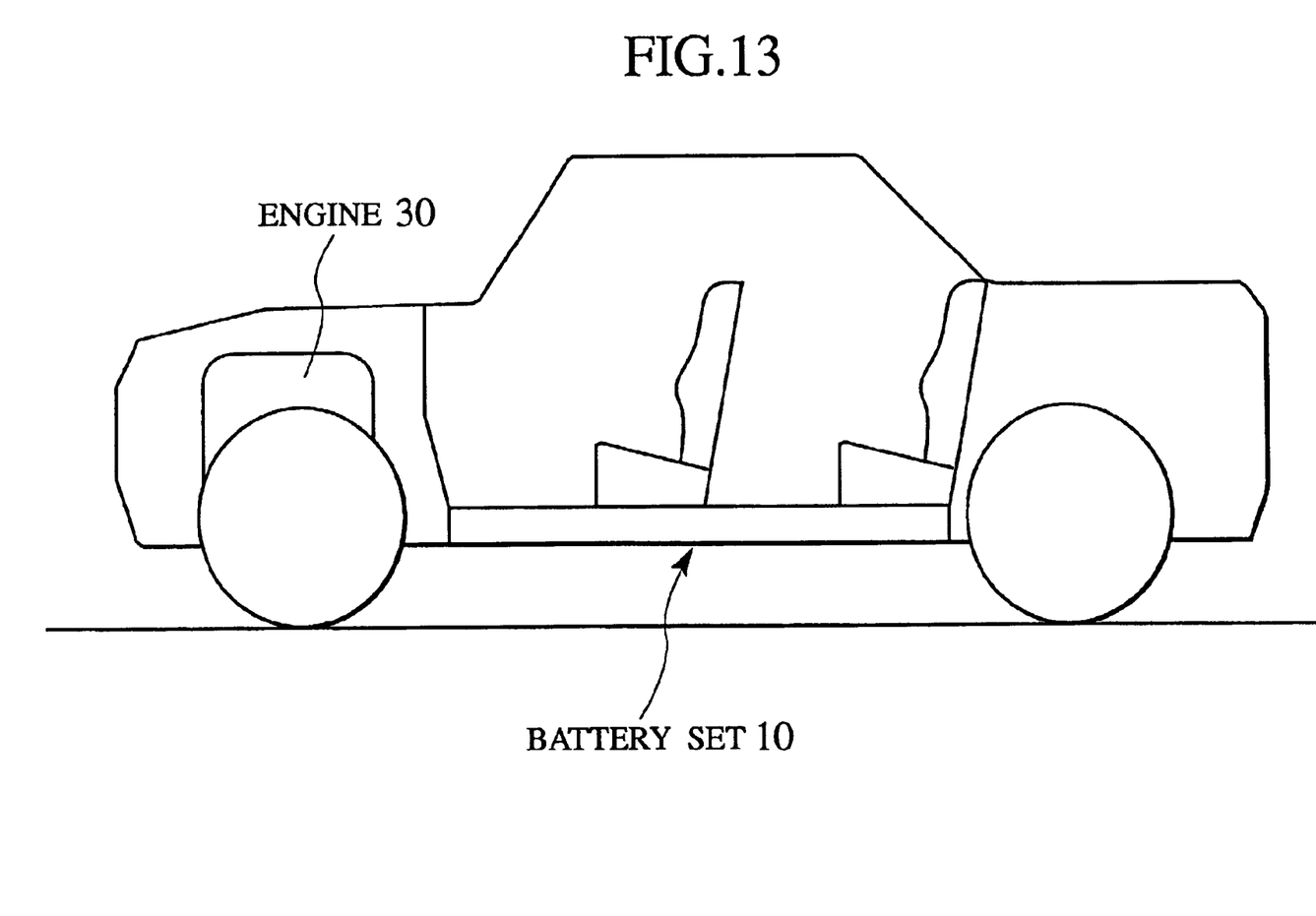
FIG. 13 is a schematic view of a hybrid vehicle incorporating the battery set shown in FIG. 1.

As shown in FIG. 12, the battery set 10 may include a plurality of groups 20 of series-connected battery cells detachably assembled in a case 22 and connected to each other by means of connecting terminals 24, 26, 28 to form a sub-module structure. The presence of the sub-module structure, that includes plural battery cell groups 20, allows the battery set to be used in a more convenient and suitable fashion especially when increasing or decreasing the number of stacks of the battery cell groups or when replacing a particular battery cell group with new one for repair. With such a structure, the battery set 10 of the present invention may be suitably installed in mobile objects such as a hybrid electric vehicle, as exemplified in FIG. 13, which has an engine 30.

The entire content of a Japanese Patent Application No. P2000-33267 with a filing date of Dec. 31, 2000 is herein incorporated by reference.

Although the invention has been described above by reference to the preferred embodiment, the invention is not limited to the embodiment described above will occur to those skilled in the art, in light of the teachings. The scope of the invention is defined with reference to the following claims.

What is claimed is:

1. A battery set comprising:

a plurality of groups of $LiMn_2O_4$ type lithium ion battery cells, wherein each of said groups includes at least four to at most fourteen of said batter cells which are connected in series, wherein said plurality of groups are one of two, five, and ten groups, and are connected in parallel, wherein each of said groups series connected battery cells includes a sub-module structure comprising a plurality of said battery cells which can be independently detachable, wherein said battery set is employed in an electric vehicle or hybrid electric vehicle, and wherein when a battery cell in one of said groups is short-circuited, an average balanced voltage of other battery cells in said group is within a range from 4.99 V to 4.28 V.

2. A battery set comprising:

two groups of $LiNiO_2$ type lithium ion battery cells, wherein each of said two groups includes at least seven to at most fourteen of said battery cells which are connected in series, wherein said two groups are connected in parallel, wherein each of said groups of series connected battery cells includes a sub-module structure comprising a plurality of said battery cells which can be independently detachable, wherein said battery set is employed in an electric vehicle or a hybrid electric vehicle, and wherein when a battery cell in one of said groups is short-circuited, an average balanced voltage of other battery cells in said group is within a range from 4.45 V to 4.27 V.

3. A battery set comprising:

two groups of Ni—H type battery cells, wherein each of said two groups includes at least three to at most five of said battery cells which are connected in series, wherein said two groups are connected in parallel, wherein each of said groups of series connected battery cells includes a sub-module structure comprising a plurality of said battery cells which can be independently detachable, wherein said battery set is employed in an electric vehicle or a hybrid electric vehicle, and wherein when a battery cell in one of said groups is short-circuited, an average balanced voltage of other battery cells in said group is within a range from 1.52 V to 1.33 V.

4. A battery set comprising:

two groups of lead battery cells, wherein each of said groups includes at least four to at most six of said battery cells which are connected in series, wherein said two groups are connected in parallel, wherein each of said groups of series connected battery cells includes a sub-module structure comprising a plurality of said battery cells which can be independently detachable, wherein said battery set is employed in an electric vehicle or a hybrid electric vehicle, and wherein when a battery cell in one of said soups is short-circuited, an average balanced voltage of other battery cells in said groups is within a range from 2.34 V to 2.19 V.

* * * * *